United States Patent
Zhang et al.

(10) Patent No.: US 12,420,923 B1
(45) Date of Patent: Sep. 23, 2025

(54) ROTARY WING-FIXED WING CONVERTIBLE MORPHING AIRCRAFT

(71) Applicant: Nanjing University of Aeronautics and Astronautics, Nanjing (CN)

(72) Inventors: Xiayang Zhang, Nanjing (CN); Chencheng Gao, Nanjing (CN); Wei Li, Nanjing (CN); Tingjie Mei, Nanjing (CN); Bin Luo, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 19/003,015

(22) Filed: Dec. 27, 2024

(30) Foreign Application Priority Data

Aug. 23, 2024 (CN) .......................... 202411174029.1

(51) Int. Cl.
*B64C 29/02* (2006.01)
*B64C 11/30* (2006.01)
*B64C 11/48* (2006.01)

(52) U.S. Cl.
CPC .............. *B64C 29/02* (2013.01); *B64C 11/30* (2013.01); *B64C 11/48* (2013.01)

(58) Field of Classification Search
CPC ........ B64C 39/001; B64C 29/02; B64C 11/48
See application file for complete search history.

(56) References Cited

U.S. PATENT DOCUMENTS

| | | | | |
|---|---|---|---|---|
| 2,387,762 | A * | 10/1945 | Leonard | B64C 29/0025 416/129 |
| 5,064,143 | A * | 11/1991 | Bucher | B64C 27/20 244/12.3 |
| 5,289,994 | A * | 3/1994 | Del Campo Aguilera | B64U 30/10 244/17.23 |
| 8,146,854 | B2 * | 4/2012 | Lawrence | B64U 40/10 244/17.23 |
| 8,505,846 | B1 * | 8/2013 | Sanders, II | B64C 11/003 244/7 B |
| 9,555,879 | B1 * | 1/2017 | Kaiser | B64D 35/06 |
| 9,815,552 | B1 * | 11/2017 | Welsh | B64U 50/19 |
| 10,414,492 | B2 * | 9/2019 | Robertson | B64U 30/21 |
| 11,242,142 | B1 * | 2/2022 | Sanders, II | B64C 15/00 |
| 11,834,149 | B2 * | 12/2023 | Baxter | B64C 5/06 |
| 11,866,161 | B1 * | 1/2024 | Pope | B64C 27/605 |

FOREIGN PATENT DOCUMENTS

GB           2582133 A  *  9/2020  ............. B64D 27/34

* cited by examiner

*Primary Examiner* — Brian M O'Hara
(74) *Attorney, Agent, or Firm* — Myers Wolin, LLC

(57) ABSTRACT

Provided is a rotary wing-fixed wing convertible morphing aircraft including a fuselage, and at least two morphing wing structures arranged on the fuselage. A tail of the fuselage is provided with a tail-thrust propeller, and each of the at least two morphing wings has an adjustable tilting angle, and includes a morphing wing body and at least one trailing edge flap which is located at a tail of the morphing wing body and is rotatable relative to the morphing wing body. The rotary wing-fixed wing convertible morphing aircraft is in a fixed wing configuration layout, or a rotary wing configuration layout.

10 Claims, 19 Drawing Sheets

ROTARY WING-FIXED WING CONVERTIBLE MORPHING AIRCRAFT

CROSS-REFERENCE TO RELATED APPLICATION

This patent application claims the benefit and priority of Chinese Patent Application No. 2024111740291 filed with the China National Intellectual Property Administration on Aug. 23, 2024, the disclosure of which is incorporated by reference herein in its entirety as part of the present application.

TECHNICAL FIELD

The present disclosure relates to the technical field of aircrafts, and in particular to a rotary wing-fixed wing convertible morphing aircraft.

BACKGROUND

An aircraft usually involves four motion states during performing a complete mission: air cruise, underwater navigation, water entry, and water exit. There are many schemes for overall layout of aircrafts, which can be generally divided into fixed wing aircrafts and rotary wing aircrafts. The research of the fixed wing aircrafts in China and at abroad started earlier, but the aircrafts with the fixed wing configuration generally has a medium transition strategy with high intensity which is accompanied by great impact in the process.

The existing aircraft generally adopts a single fixed wing or rotary wing aerodynamic layout, but there is little research on coupling type layout of the aircraft. The design point of the aircraft is usually designed for the flight condition of a specific flight mission, or is adopted a compromise design for the aerodynamic performance in various flight conditions. When the aircraft encounters a harsh flight environment, a control surface needs to be deviated greatly to stabilize the aircraft, resulting that the optimal aerodynamic characteristics cannot be achieved in various flight conditions, limiting the increase of the forward speed. The deviation of the control surface even exceeds an upper limit of the deviation of the fixed control surface, resulting that it impossible to keep the aircraft stable. Most researchers choose the multi-rotary wing layout because of its simple structure, easy implementation, and low cost, the difficulties in the process of water-air crossing are avoided through different designs of configuration (the main disadvantages of the aircraft are as follows: 1. the control is difficult, and the stability is poor during medium transition; 2. the maximum flight speed is limited; and 3. requirements of the flight mission cannot be satisfied). However, in the process of water-air crossing, multiphase flow interference, ground/water effect and so on seriously affect the rotary wing performance.

SUMMARY

An objective of the present disclosure is to provide a rotary wing-fixed wing convertible morphing aircraft, so that the overall performance of an aircraft can be improved, the coupling of a fixed wing configuration layout and a rotary wing configuration layout can be achieved, realizing multi-attitude control and multi-mode medium transition.

To achieve the objective above, the present disclosure provides the following technical solution:

The present disclosure provides a rotary wing-fixed wing convertible morphing aircraft, including a fuselage, where a tail of the fuselage is provided with a tail-thrust propeller; and at least two morphing wing structures arranged on the fuselage, where each of the at least two morphing wing structures includes at least two morphing wings, and is rotatable around a central line of the fuselage; each of the at least two morphing wings has an adjustable tilting angle, and includes a morphing wing body and at least one trailing edge flap which is located at a tail of the morphing wing body and is rotatable relative to the morphing wing body; and the rotary wing-fixed wing convertible morphing aircraft is in a fixed wing configuration layout, or a rotary wing configuration layout.

Preferably, the at least two morphing wings of each of the at least two morphing wing structures are uniformly distributed around the central line of the fuselage.

Preferably, each of the at least two morphing wing structures is connected to a central shaft of the fuselage through a morphing rotating device, and the morphing rotating device is able to drive the at least two morphing wing structures to rotate around the central line of the fuselage.

Preferably, the tilting angle of each of the at least two morphing wings is rotated around a tilting mounting shaft thereof through a tilting rotating device, thus achieving adjustment of the tilting angle of each of the at least two morphing wings.

Preferably, each of the at least one trailing edge flap is rotated relative to the morphing wing body through a trailing edge flap rotating device.

Preferably, in a case that the rotary wing-fixed wing convertible morphing aircraft is in a fixed wing configuration layout, an included angle between adjacent morphing wing structures is 0° or 180°/n, wherein n is a number of the at least two morphing wings in each of the at least two morphing wing structures.

Preferably, each of the least two morphing wing structures comprises two morphing wings, and in a case that the rotary wing-fixed wing convertible morphing aircraft is in the fixed wing configuration layout, the included angle between the two adjacent morphing wing structures is 0° or 90°.

Preferably, in a case that the rotary wing-fixed wing convertible morphing aircraft is in the rotary wing configuration layout, and when the tail-thrust propeller rotates forward, a sum of a torque generated by some of the at least two morphing wing structures in forward rotation and a torque generated by the tail-thrust propeller in forward rotation is a total forward rotation torque, and a sum of the total forward rotation torque and a torque generated by a remaining of the at least two morphing wing structures in reverse rotation is zero; and when the tail-thrust propeller rotates reversely, a sum of a torque generated by some of the at least two morphing wing structures in reverse rotation and a torque generated by the tail-thrust propeller in reverse rotation is a total reverse rotation torque, and a sum of the total reverse rotation torque and the torque generated by a remaining of the at least two morphing wing structures in forward rotation is zero.

Preferably, the tilting angle of each of the at least two morphing wings ranges from −10° to 100°.

Preferably, in a case that the rotary wing-fixed wing convertible aircraft is in hovering flight, the rotary wing-fixed wing convertible morphing aircraft is in the rotary wing configuration layout, and maneuvering flight of the rotary wing-fixed wing convertible morphing aircraft is achieved by biasing of the at least one trailing edge flap of each of the at least two morphing wings, the rotary wing-fixed wing convertible morphing aircraft converts from the rotary wing configuration layout to the fixed wing configuration layout during transition from the hovering flight to forward flight thereof; and in a case that the rotary wing-fixed wing convertible morphing aircraft flies forward, the rotary wing-fixed wing convertible morphing aircraft is in the fixed wing configuration layout, forward power is provided through rotation of the tail-thrust propeller, and attitude motion and overall trim are controlled by the at least one trailing edge flap of each of the at least two morphing wings.

Compared with the prior art, the present disclosure has the following technical effects:

According to the rotary wing-fixed wing convertible morphing aircraft provided by the present disclosure, the conversion between a rotary wing configuration layout and a fixed wing configuration layout through the morphing wing structures to achieve a rotary wing hovering flight mode and a high-speed fixed wing forward flight mode. Self-adaptation can be achieved according to the change of the flight environment and flight mission requirements. A morphing wing, a tail-thrust propeller and a trailing-edge flap are mutually coupled to achieve high-speed flight and large maneuvering control. The present disclosure has novel and simple structure, low cost, and excellent maneuverability, sensitivity, and robustness, is suitable for complex and changeable external environment and satisfy various flight mission requirements, thus having great application prospects and strategic values.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
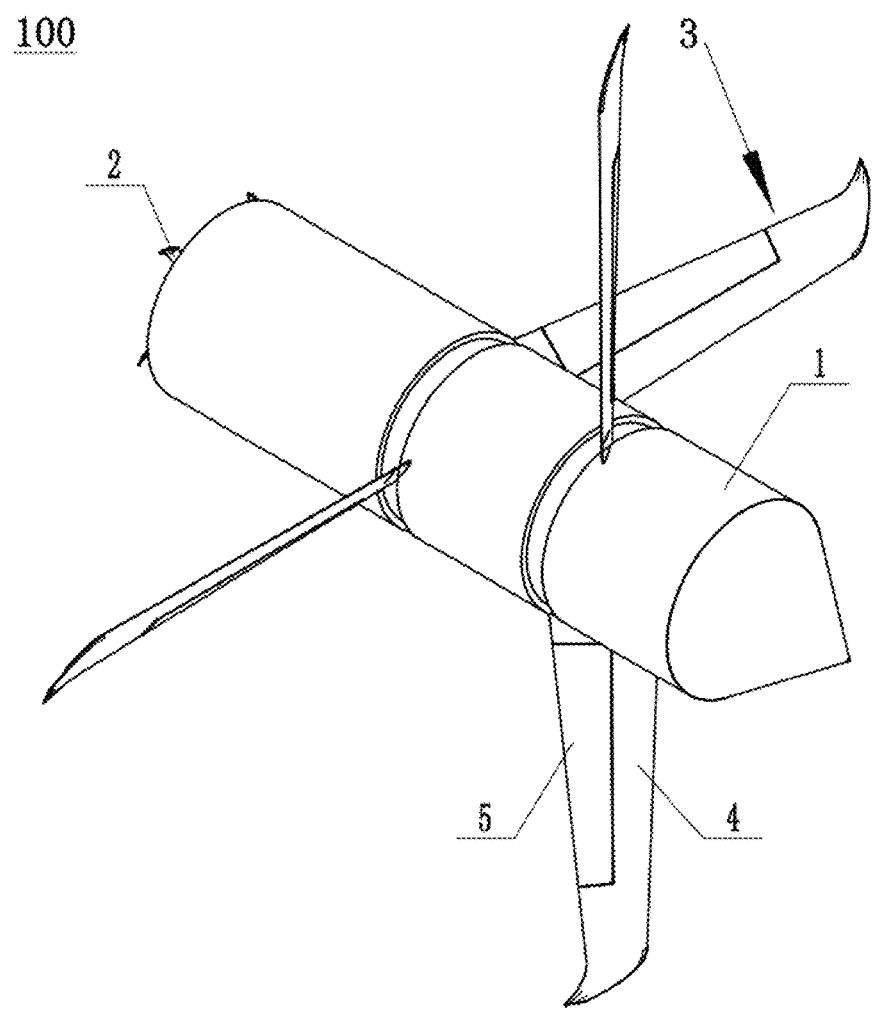
FIG. 1 is an isometric diagram of a rotary wing-fixed wing convertible morphing aircraft in a rotary wing configuration layout according to the present disclosure.
Figure 2:
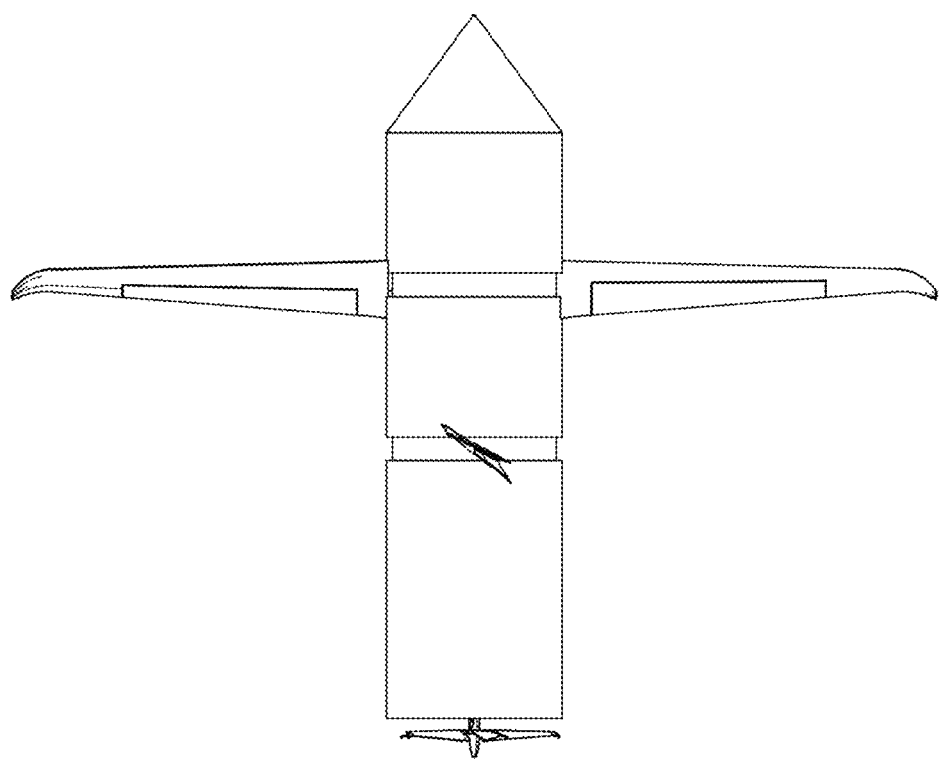
FIG. 2 is a front view of a rotary wing-fixed wing convertible morphing aircraft in a rotary wing configuration layout according to the present disclosure.
Figure 3:
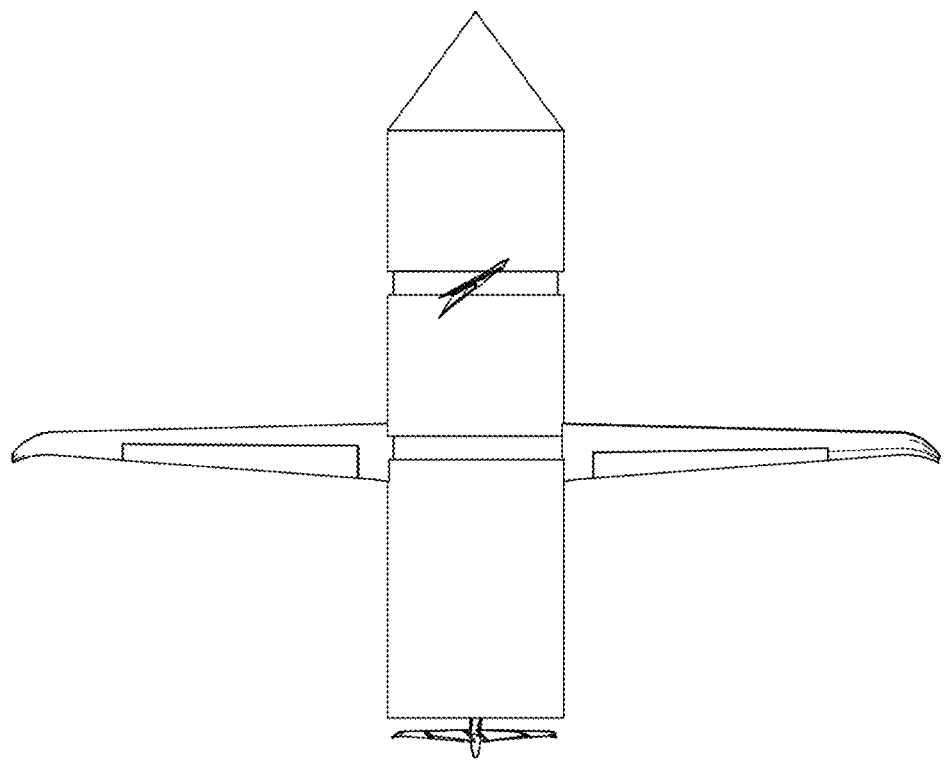
FIG. 3 is a first side view of a rotary wing-fixed wing convertible morphing aircraft in a rotary wing configuration layout according to the present disclosure.
Figure 4:
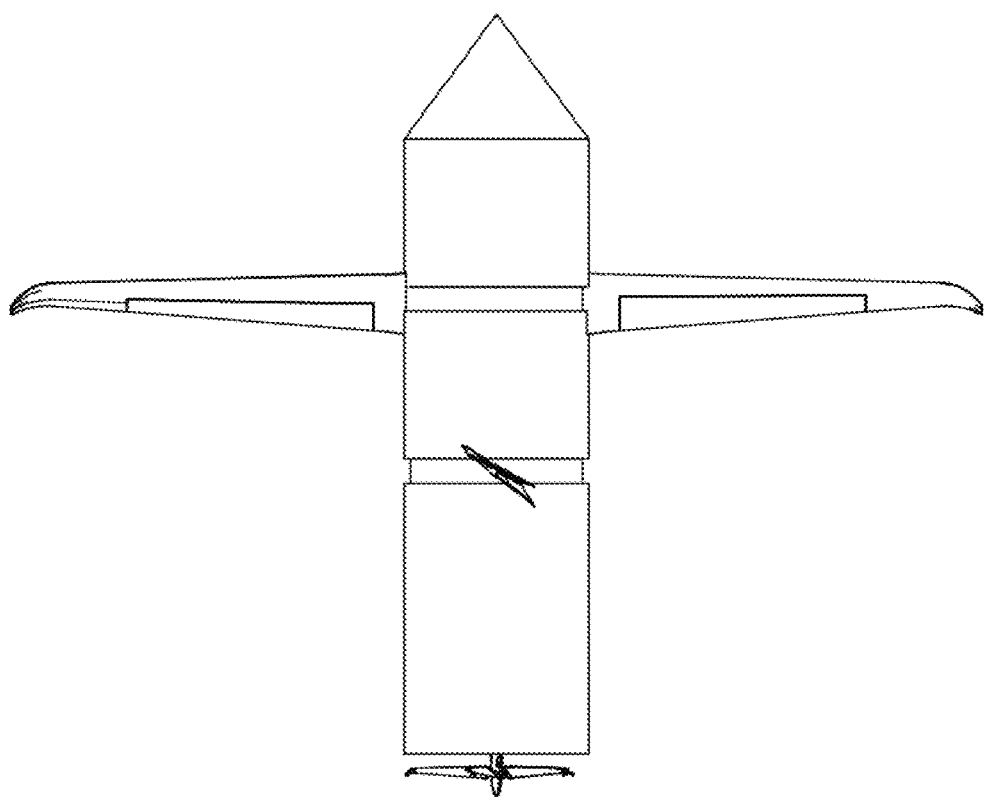
FIG. 4 is a rear view of a rotary wing-fixed wing convertible morphing aircraft in a rotary wing configuration layout according to the present disclosure.
Figure 5:
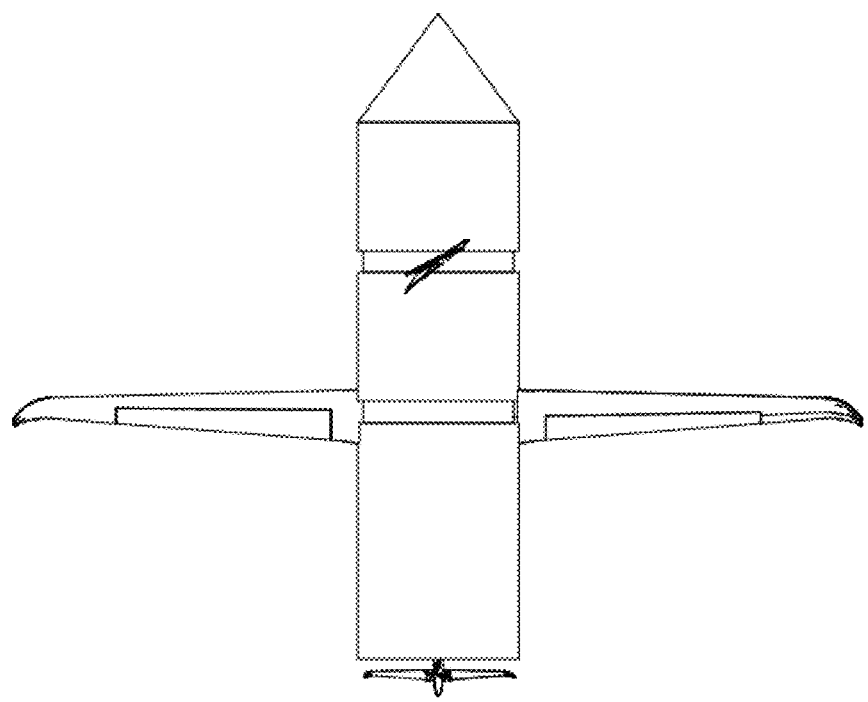
FIG. 5 is a second side view of a rotary wing-fixed wing convertible morphing aircraft in a rotary wing configuration layout according to the present disclosure.
Figure 6:
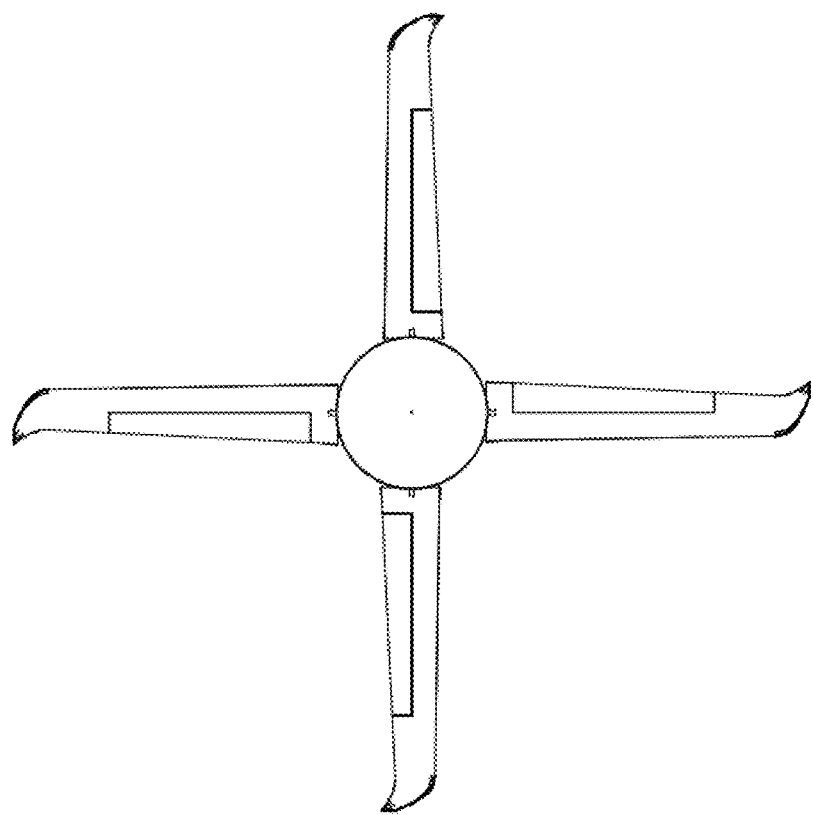
FIG. 6 is a top view of a rotary wing-fixed wing convertible morphing aircraft in a rotary wing configuration layout according to the present disclosure.
Figure 7:
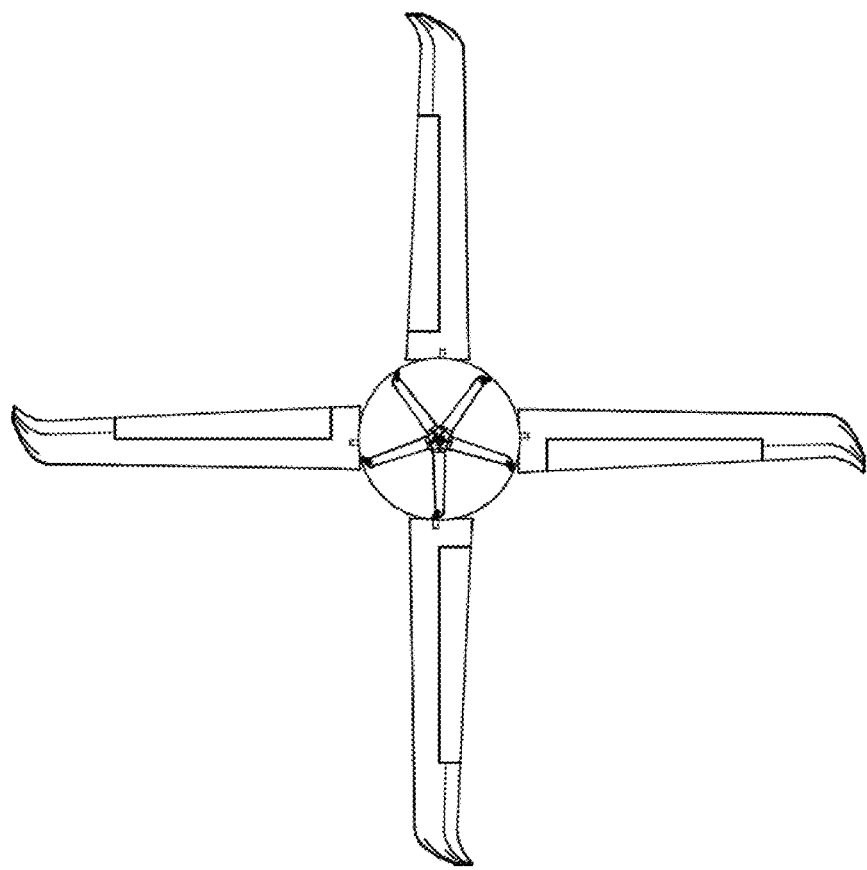
FIG. 7 is a bottom view of a rotary wing-fixed wing convertible morphing aircraft in a rotary wing configuration layout according to the present disclosure.
Figure 8:
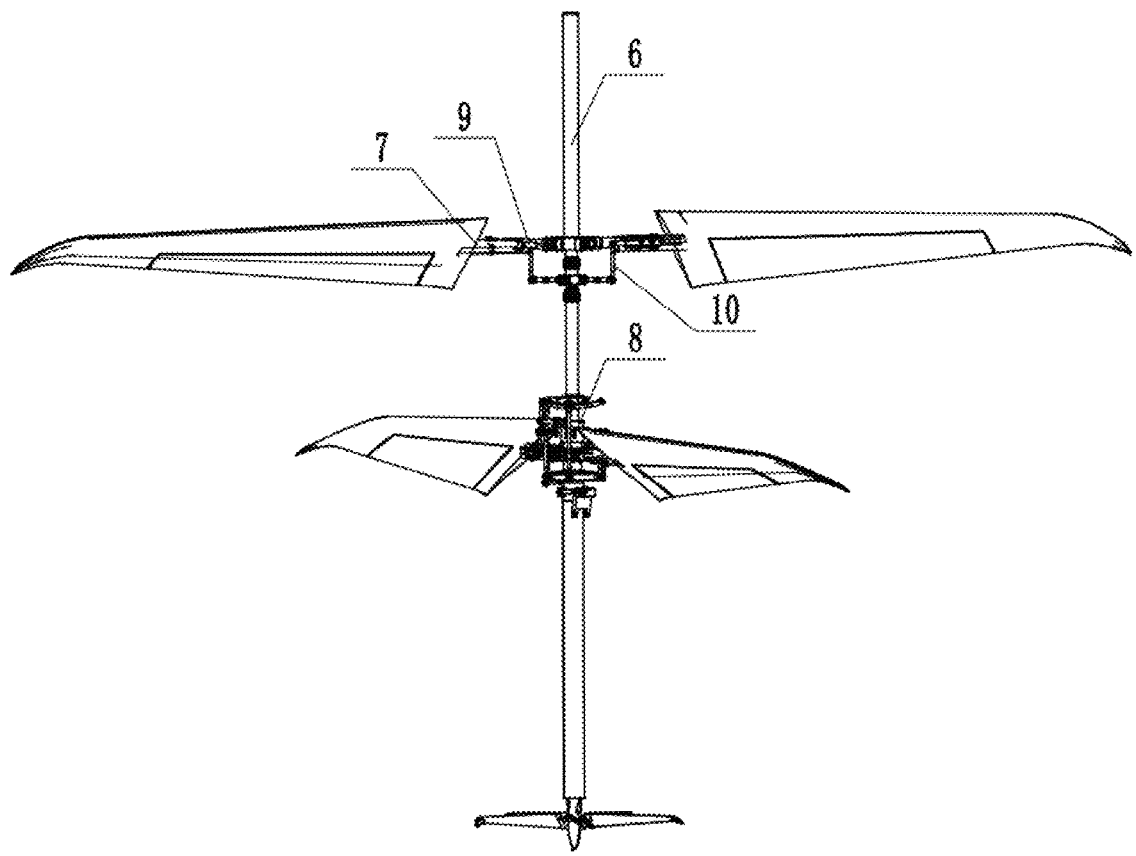
FIG. 8 is a schematic diagram of an internal structure of a rotary wing-fixed wing convertible morphing aircraft according to the present disclosure.

In the drawings: 100 rotary wing-fixed wing convertible morphing aircraft; 1 fuselage; 2 tail-thrust propeller; 3 morphing wing; 4 morphing wing body; 5 trailing edge flap; 6 central shaft; 7 tilting mounting shaft; 8 morphing rotating device; 9 tilting rotating device; and 10 tilting push rod.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a rotary wing-fixed wing convertible morphing aircraft, so that the overall performance of the aircraft can be improved and the coupling of a fixed wing configuration layout and a rotary wing configuration layout can be achieved, realizing multi-attitude control and multi-mode medium transition.

In order to make the objectives, features and advantages of the present disclosure more clearly, the present disclosure is further described in detail below with reference to the accompanying drawings and specific embodiments.

Figure 9:
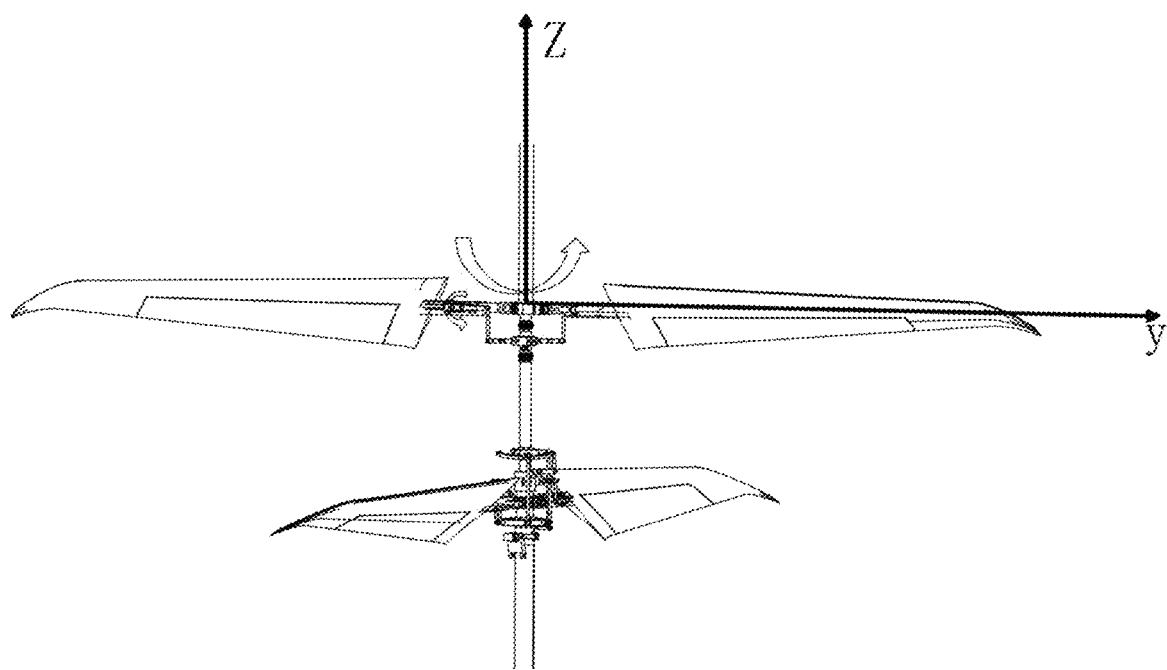
FIG. 9 is a schematic diagram of the rotation of morphing wing structures and the rotation of morphing wings according to the present disclosure.
Figure 10:
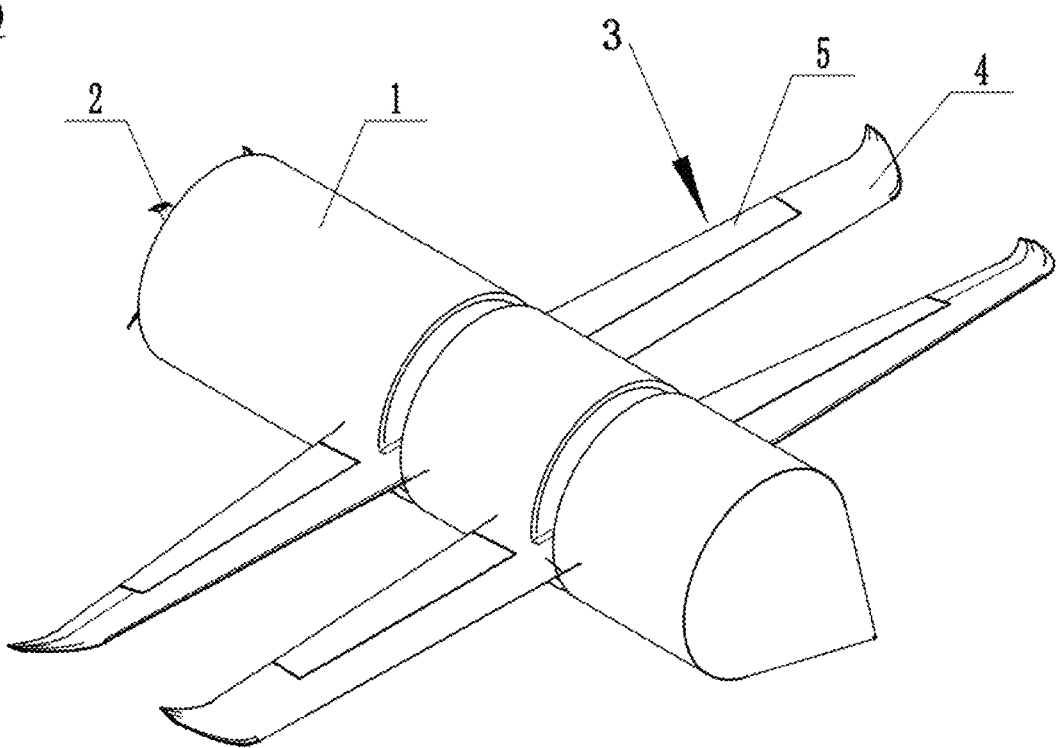
FIG. 10 is an isometric diagram of a rotary wing-fixed wing convertible morphing aircraft in a fixed wing configuration layout with an included angle between morphing wing structures of 0° according to the present disclosure.
Figure 11:
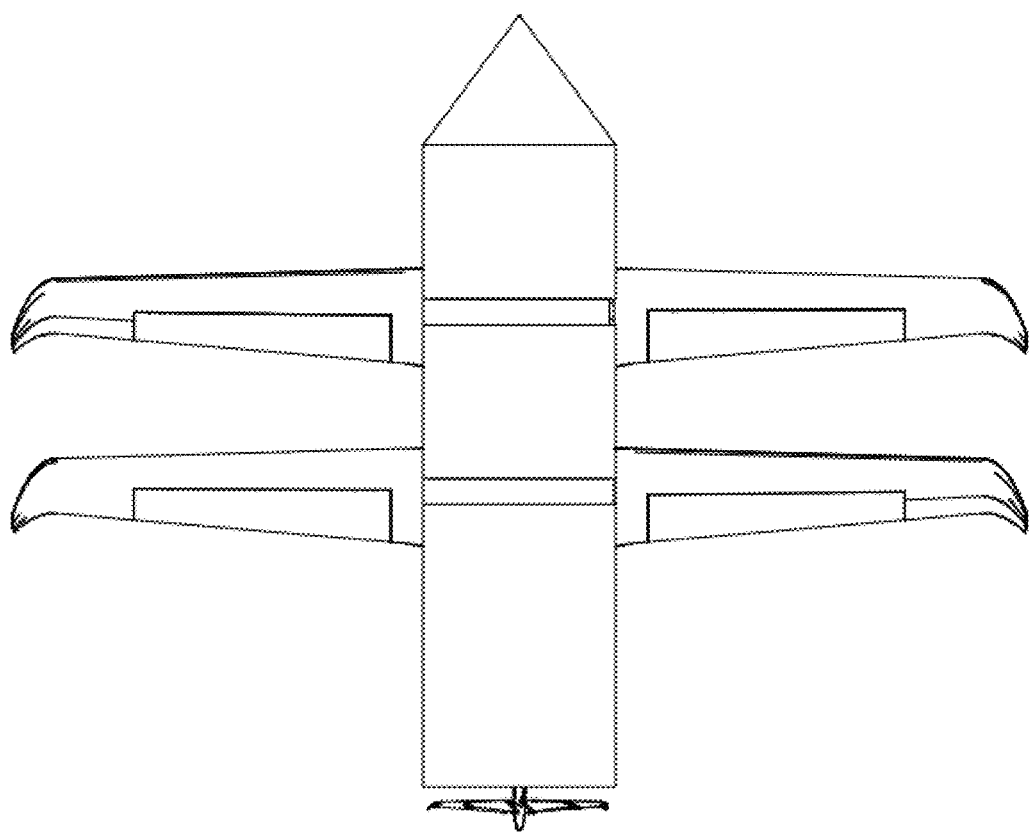
FIG. 11 is a front view of a rotary wing-fixed wing convertible morphing aircraft in a fixed wing configuration layout with an included angle between morphing wing structures of 0° according to the present disclosure.
Figure 12:
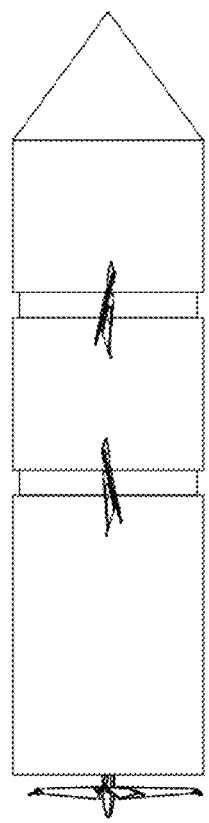
FIG. 12 is a first side view of a rotary wing-fixed wing convertible morphing aircraft in a fixed wing configuration layout with an included angle between morphing wing structures of 0° according to the present disclosure.
Figure 13:
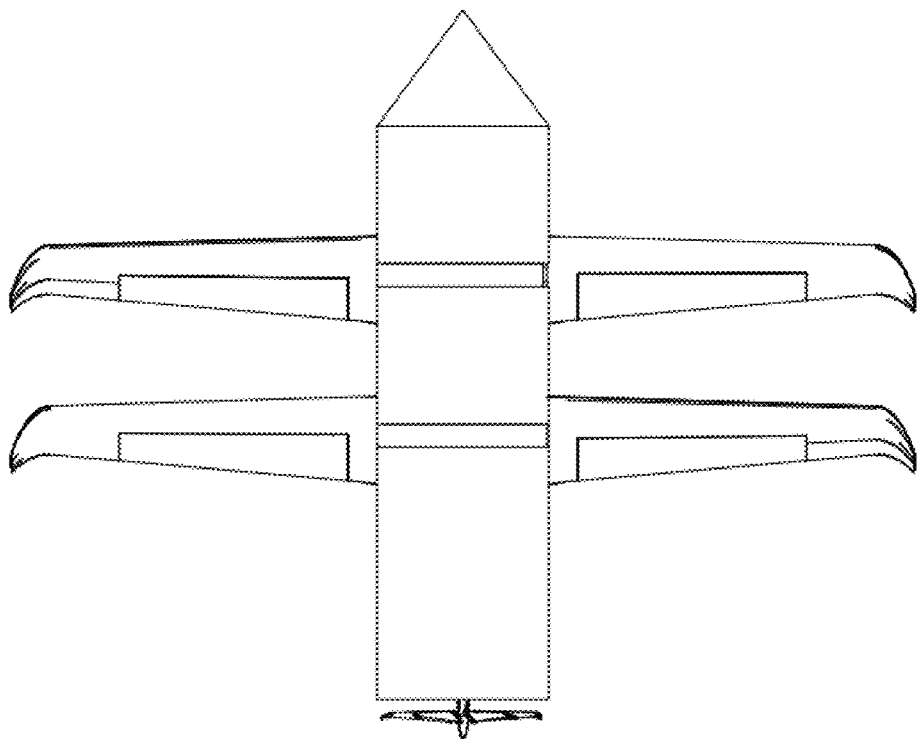
FIG. 13 is a rear view of a rotary wing-fixed wing convertible morphing aircraft in a fixed wing configuration layout with an included angle between morphing wing structures of 0° according to the present disclosure.
Figure 14:
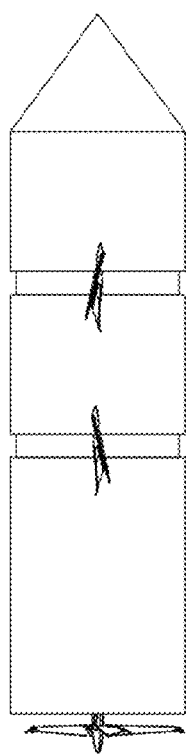
FIG. 14 is a second side view of a rotary wing-fixed wing convertible morphing aircraft in a fixed wing configuration layout with an included angle between morphing wing structures of 0° according to the present disclosure.
Figure 15:
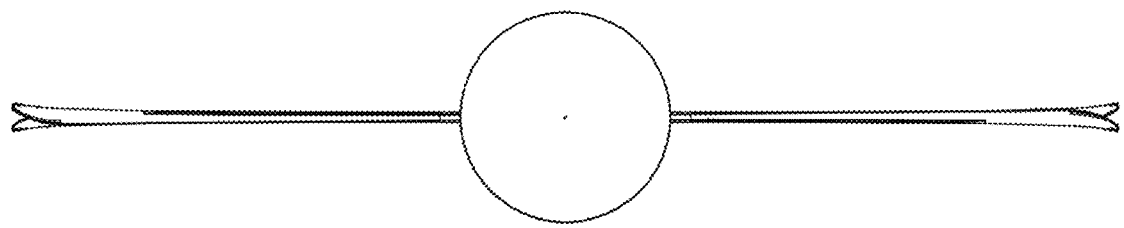
FIG. 15 is a top view of a rotary wing-fixed wing convertible morphing aircraft in a fixed wing configuration layout with an included angle between morphing wing structures of 0° according to the present disclosure.
Figure 16:
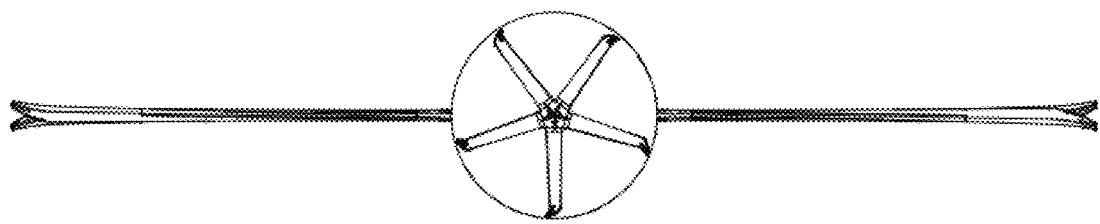
FIG. 16 is a bottom view of a rotary wing-fixed wing convertible morphing aircraft in a fixed wing configuration layout with an included angle between morphing wing structures of 0° according to the present disclosure.
Figure 17:
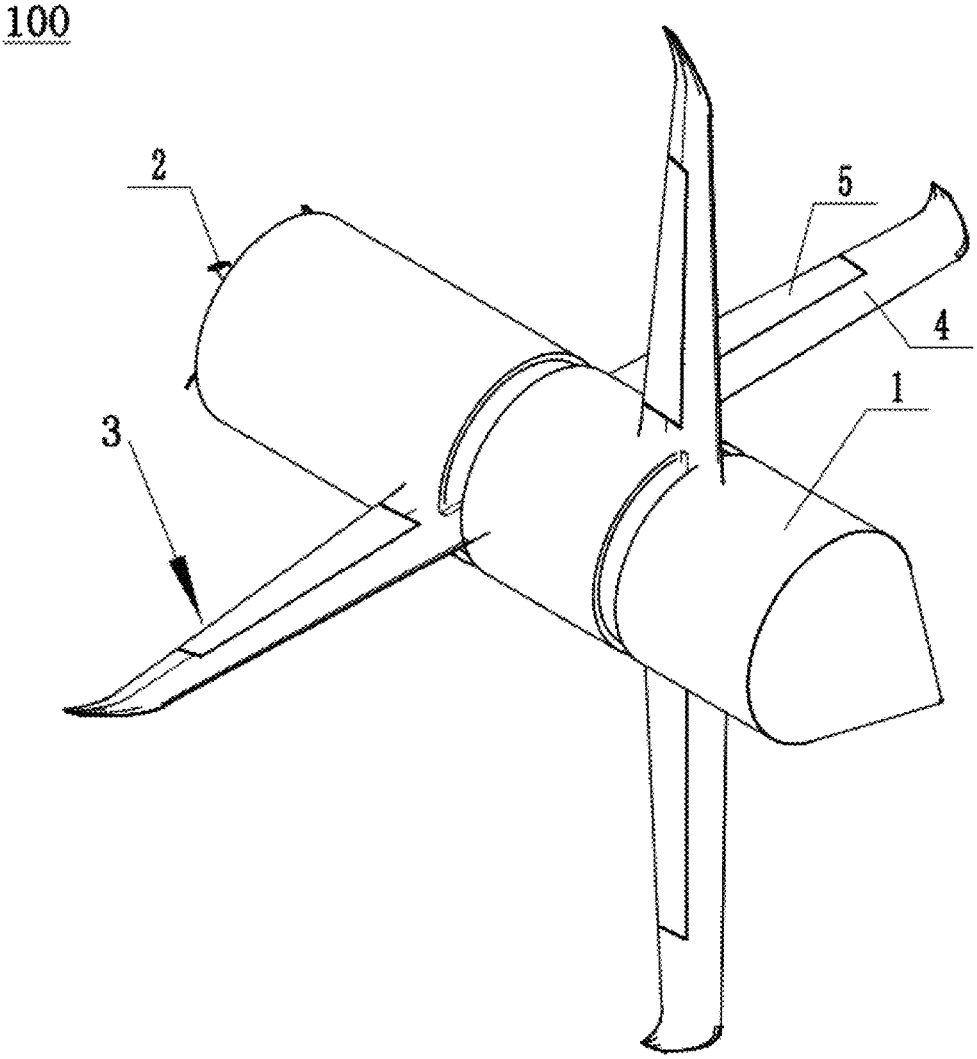
FIG. 17 is an isometric diagram of a rotary wing-fixed wing convertible morphing aircraft in a fixed wing configuration layout with an included angle between adjacent morphing wing structures of 90° according to the present disclosure.
Figure 18:
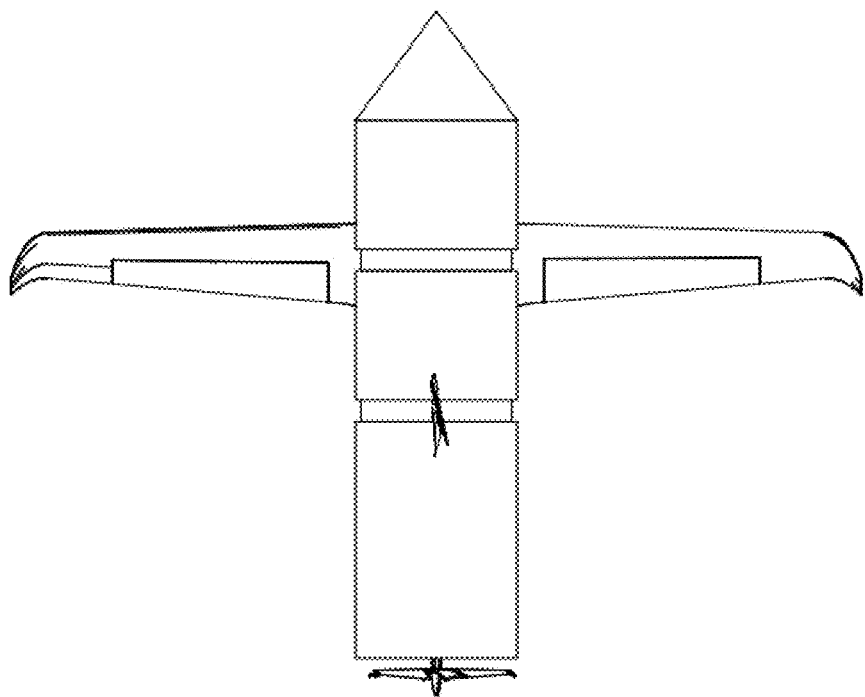
FIG. 18 is a front view of a rotary wing-fixed wing convertible morphing aircraft in a fixed wing configuration layout with an included angle between adjacent morphing wing structures of 90° according to the present disclosure.
Figure 19:
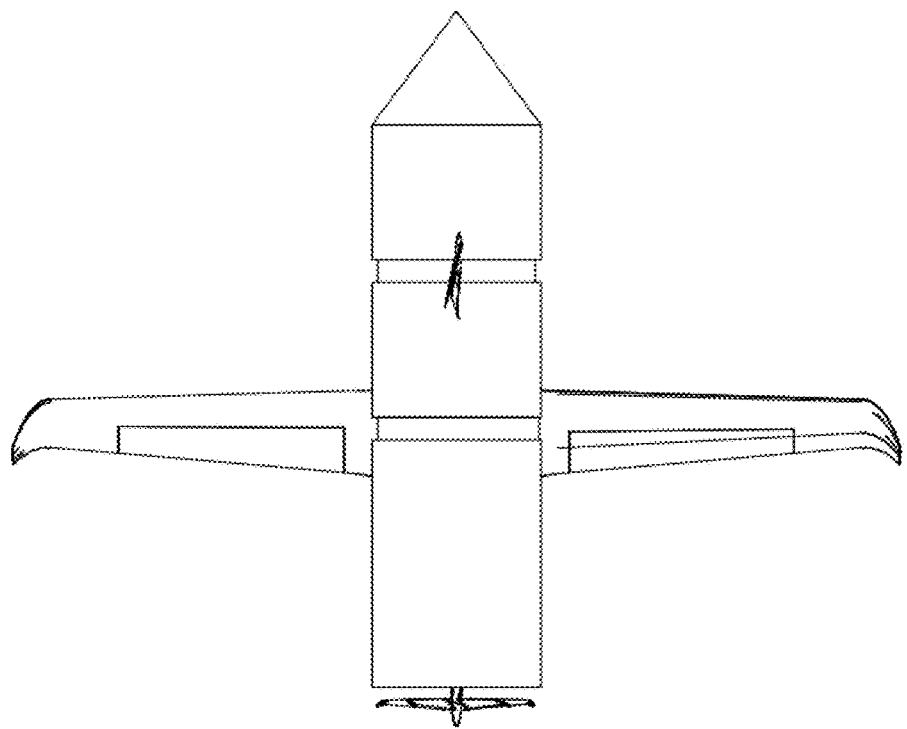
FIG. 19 is a first side view of a rotary wing-fixed wing convertible morphing aircraft in a fixed wing configuration layout with an included angle between adjacent morphing wing structures of 90° according to the present disclosure.
Figure 20:
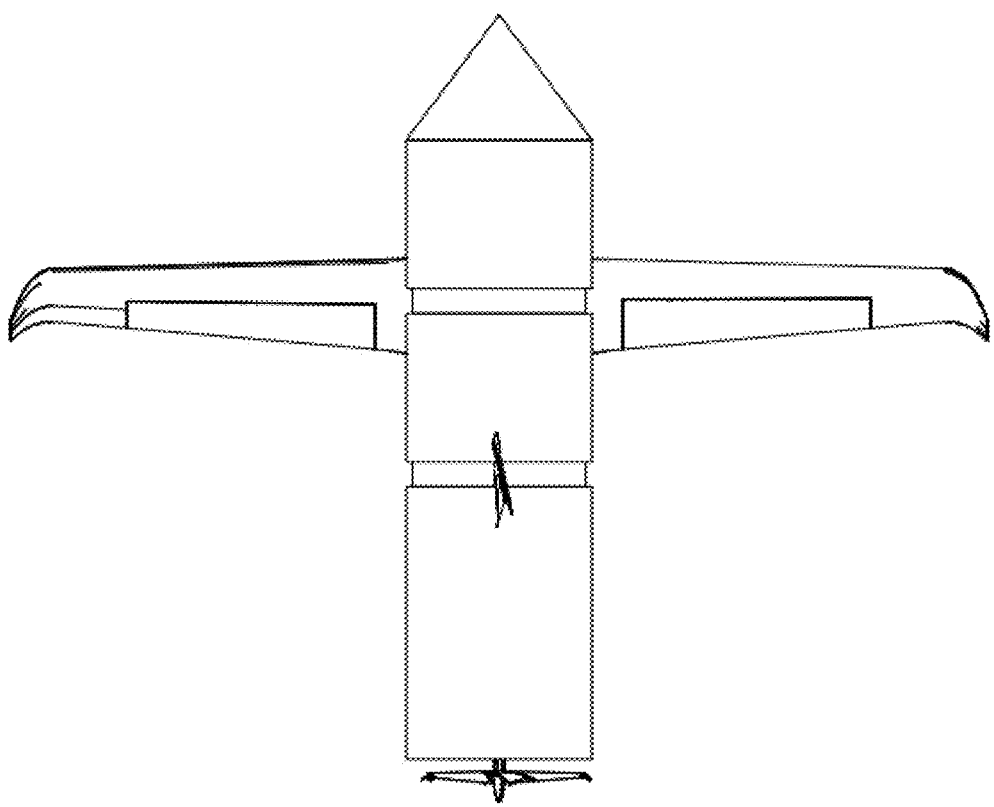
FIG. 20 is a rear view of a rotary wing-fixed wing convertible morphing aircraft in a fixed wing configuration layout with an included angle between adjacent morphing wing structures of 90° according to the present disclosure.
Figure 21:
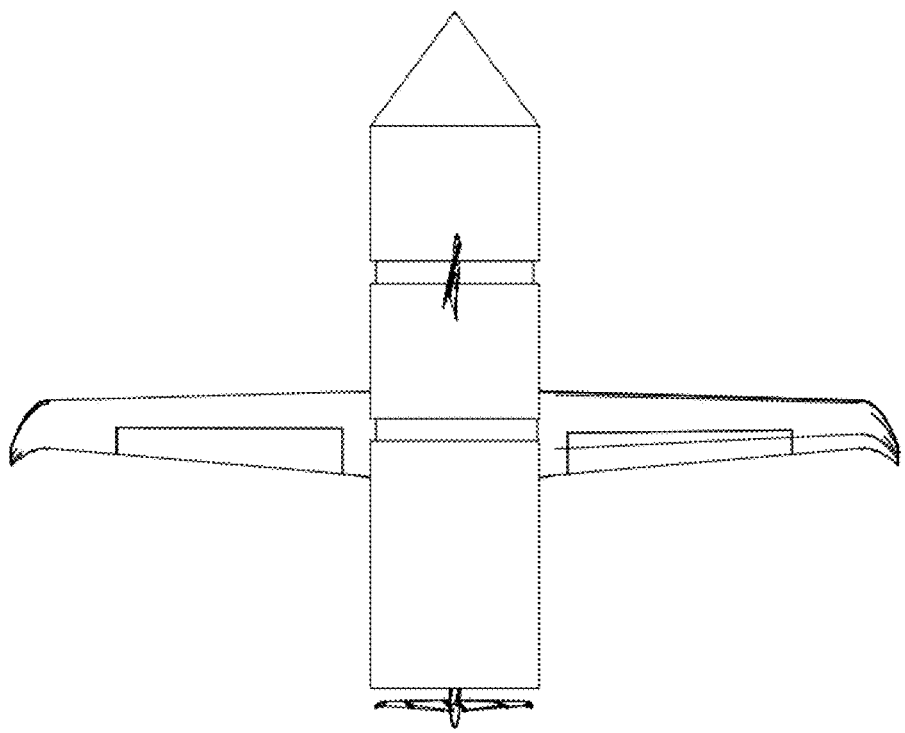
FIG. 21 is a second side view of a rotary wing-fixed wing convertible morphing aircraft in a fixed wing configuration layout with an included angle between adjacent morphing wing structures of 90° according to the present disclosure.
Figure 22:
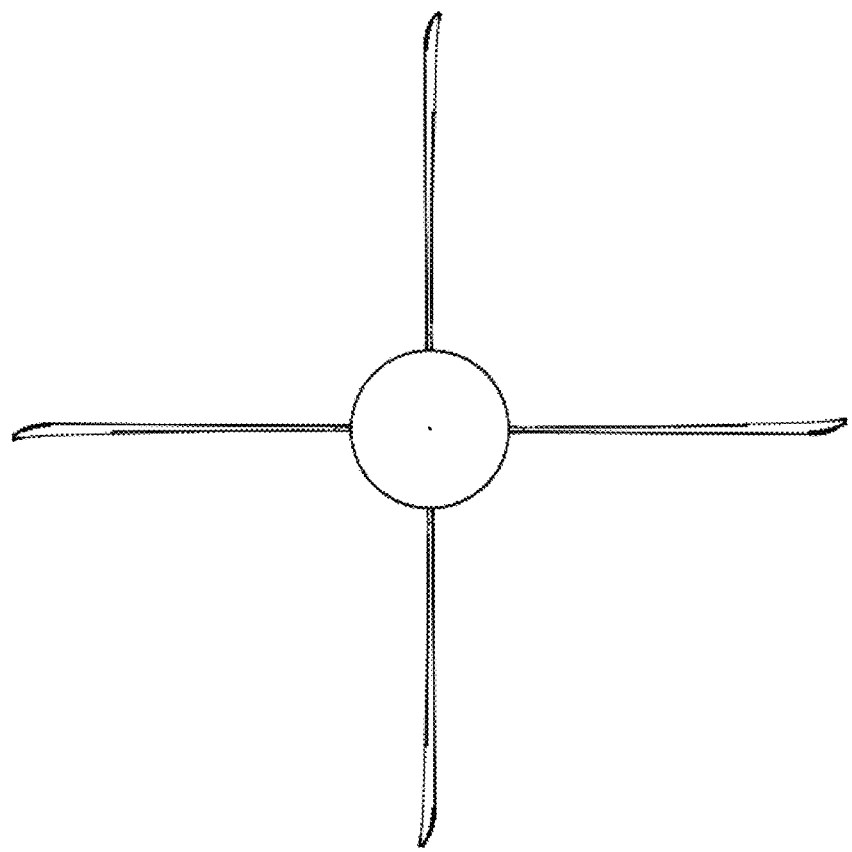
FIG. 22 is a top view of a rotary wing-fixed wing convertible morphing aircraft in a fixed wing configuration layout with an included angle between adjacent morphing wing structures of 90° according to the present disclosure.
Figure 23:
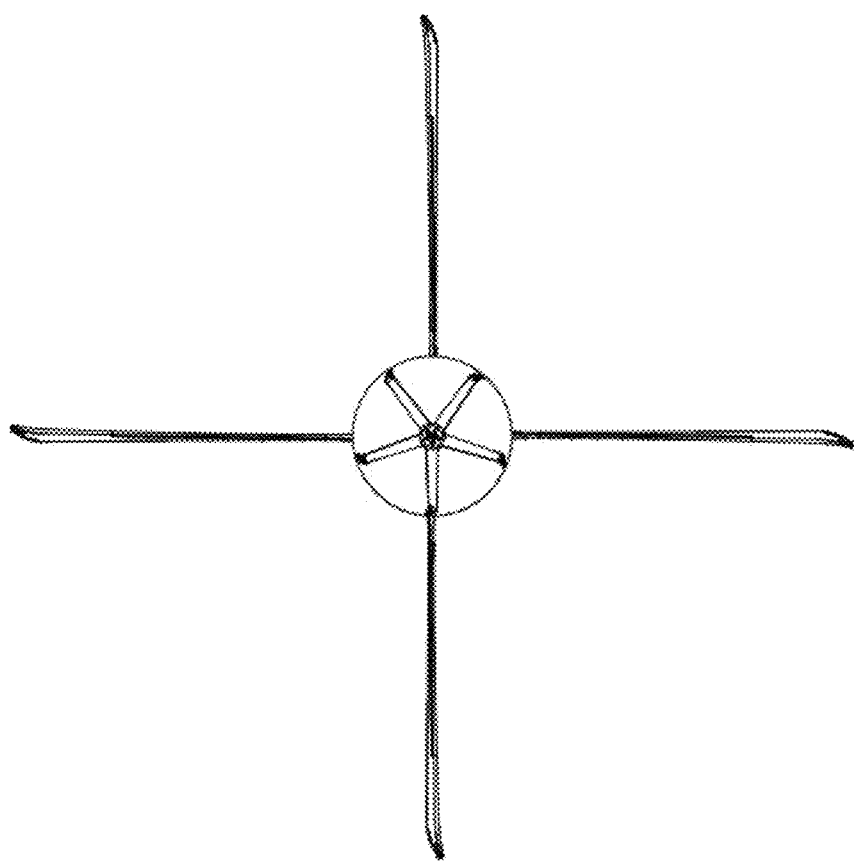
FIG. 23 is a bottom view of a rotary wing-fixed wing convertible morphing aircraft in a fixed wing configuration layout with an included angle between adjacent morphing wing structures of 90° according to the present disclosure.

As shown in FIG. 1 to FIG. 23, this embodiment provides a rotary wing-fixed wing convertible morphing aircraft 100, including a fuselage 1, where a tail of the fuselage 1 is provided with a tail-thrust propeller 2 which can increase the propulsion force in the air and water; and at least two morphing wing structures arranged on the fuselage 1, where each morphing wing structure includes at least two morphing wings 3, and is rotatable around a central line (i.e., Z axis in FIG. 9) of the fuselage 1. A tilting angle of the morphing wing 3 is adjustable, and the morphing wing 3 includes a morphing wing body 4, and at least one trailing edge flap 5. The trailing edge flap 5 is located at a tail of the morphing wing body 4, and is rotatable relative to the morphing wing body 4. The rotary wing-fixed wing convertible morphing aircraft 100 may be in a fixed wing configuration layout or a rotary wing configuration layout. In the rotary wing configuration layout, the morphing wing 3 is used as a tiltable blade to provide a lift force and a control torque; and in the fixed wing configuration layout, the morphing wing 3 is used as an all-moving wing to provide a lift force and a control torque, realizing the dual-use of the morphing wing 3, and simplifying and lightening the structure of the rotary wing-fixed wing convertible morphing aircraft 100. Combined with the tail-thrust propeller 2, the transition between different media can be achieved. The rotary wing-fixed wing convertible morphing aircraft 100 in the fixed wing configuration layout that is a typical ballistic layout can carry out multi-directional high-speed underwater-surface-air trinity attack.

Specifically, in this embodiment, the fuselage 1 may be a ballistic fuselage, but is not limited to this.

In this embodiment, there are preferably two morphing wing structures.

In this embodiment, at least two morphing wings 3 of each morphing wing structure are uniformly distributed around the center line of the fuselage 1 (i.e., a center line of a central shaft). The morphing wing 3 is in an advanced aerodynamic shape, and the morphing wing 3 is preferably a backswept variable-chord length blade in a wing in a complex shape layout, but is not limited to the morphing wing provided in this embodiment, and the required morphing wing can be designed according to the mission requirements and application scenarios.

In this embodiment, the morphing wing structure is connected to a central shaft 6 of the fuselage 1 through a morphing rotating device 8, and the morphing rotating device 8 can drive the morphing wing structure to rotate around the central line of the fuselage 1. The morphing rotating device 8 is preferably a hub system, but is not limited to the hub system provided in this embodiment.

In this embodiment, the tilting angle of each morphing wing 3 rotates around an axis (i.e., Y axis in FIG. 9) of a tilting mounting shaft 7 of the morphing wing 3 through a tilting rotating device 9, thus achieving the adjustment of the tilting angle of each morphing wing 3. The tilting rotating device 9 is preferably a hub variable pitch structure, but is not limited to the hub variable pitch structure provided in this embodiment, or may be a simple gear rotating structure. In this embodiment, a tilting push rod 10 moves downwards to drive the morphing wing 3 to rotate around Y axis.

In this embodiment, the trailing edge flap 5 is rotatable relative to the morphing wing body 4 through a trailing edge flap rotating device. The trailing edge flap rotating device is preferably a steering engine, an actuator, or a driving structure made of an intelligent material, but is not limited to the morphing tilting actuator provided in this embodiment.

In this embodiment, in a case that the rotary wing-fixed wing convertible morphing aircraft 100 is in the rotary wing configuration layout, there are two situations: 1 . . . when the tail-propelled propeller rotates forward, the sum of a torque generated by the morphing wing structure in a forward rotation and a torque generated by the tail-thrust propeller in a forward rotation is a total forward rotation torque, and the sum of the total forward rotation torque and a torque generated by the morphing wing structure in a reverse rotation is zero; 2. when the tail-thrust propeller rotates reversely, the sum of the torque generated by the morphing wing structure in a reverse rotation and a torque generated by the tail-thrust propeller in a reverse rotation is a total reverse rotation torque, and the sum of the total reverse rotation torque and the torque generated by the morphing wing structure in a forward rotation is zero. In the rotary wing configuration layout, the morphing wing 3 provides a lift force by rotating around the fuselage 1, and changes a total pitch and a moment by rotating around the tilting mounting shaft 7.

In this embodiment, the morphing wings 3 in the rotary wing configuration layout can rotate into the fixed wing configuration layout by the morphing rotating device 8. In a case that the rotary wing-fixed wing convertible morphing aircraft 100 is in the fixed wing configuration layout, an included angle between adjacent morphing wing structures is 0° or 180°/n, where n is the number of the morphing wings 3 in each morphing wing structure.

Furthermore, in this embodiment, there are two morphing wings 3 in each morphing wing structure. In a case that the rotary wing-fixed wing convertible morphing aircraft 100 is in the fixed wing configuration layout, an included angle between two adjacent morphing wing structures is 0° or 90°. When the included angle between the two morphing wing structures is 0°, the two morphing wing structures are arranged in parallel. When the included angle between the two morphing wing structures is 90°, the two morphing wing structures are arranged in a cross shape.

In this embodiment, the tilting angle of the morphing wing 3 around the tilting mounting shaft 7 of the morphing wing 3 ranges from −10° to 100°, thus ensuring a certain safety margin of the morphing wing 3. The morphing wing 3 can achieve multi-angle rotation, thus achieving the multifunctional use of the morphing wing 3.

In this embodiment, when the rotary wing-fixed wing convertible morphing aircraft 100 hovers in the air or water, the rotary wing-fixed wing convertible morphing aircraft 100 is in the rotary wing configuration layout. During hovering flight, a preferred trim method is that the morphing wing structure located above and the lower morphing wing structure located below rotate in opposite directions, and the sum of a moment generated by the rotation of the morphing wing structure located above and a moment generated by the rotation of the tail-thrust propeller 2 is equal to a corresponding moment generated by the rotation of the morphing wing structure located below, alternatively, the sum of a moment generated by the rotation of the morphing wing structure located below and the moment generated by the rotation of the tail-thrust propeller 2 is equal to a corresponding moment generated by the rotation of the morphing wing structure located above. By setting rotating speeds of the morphing wing structures to be different and cooperating with the rotation of the tail-thrust propeller 2, an altitude control and moment balance of the aircraft are achieved. During hovering flight, a preferred control mode is that the trailing edge flap 5 is biased at a higher order (that is, a rotating speed of the trailing edge flap 5 is 0-4 times that of the morphing wing 3 in the rotary wing configuration layout) to achieve the maneuvering flight of the aircraft, and the trailing edge flap 5 is controlled to bias at a higher order to provide a control moment of the aircraft.

During the rotary wing-fixed wing convertible morphing aircraft 100 transitions from the hovering flight to forward flight, the speed gradually increases, the tail-thrust propeller 2 starts to operate, the rotary wing-fixed wing convertible morphing aircraft 100 converts from the rotary wing configuration layout into the fixed wing configuration layout, the morphing wing 3 gradually provides the lift force, and the trailing edge flap 5 controls the attitude motion and overall trim.

When the rotary wing-fixed wing convertible morphing aircraft 100 flies forward, the rotary wing-fixed wing convertible morphing aircraft 100 is in the fixed wing configuration layout, forward power is provided by the rotation of the tail-thrust propeller 2, and the morphing wing 3 can provide transverse and longitudinal stability. The rotation of the morphing wing 3 around the tilting mounting shaft 7 can be used as an all-moving tailplane and an all-moving fin to achieve attitude balance, and the attitude motion is controlled by the trailing edge flap 5 of the morphing wing 3, and the trailing edge flap 5 can be synchronously biased to achieve the overall trim of the fuselage 1. During forward flight, the whole rotary wing-fixed wing convertible morphing aircraft 100 is in the fixed-wing configuration layout (i.e., a ballistic layout), which can reduce navigation resistance in water.

During vertical takeoff and vertical landing of the rotary wing-fixed wing convertible morphing aircraft 100, the up and down motion and medium transition of the aircraft can be achieved by changing the rotating speeds of the two morphing wing structures, and the maneuvering motion of the aircraft is achieved by changing a biasing frequency of the trailing edge flap 5 of the morphing wing 3. The forward and backward motion of the aircraft is achieved by converting the morphing wing 3 from the rotary wing configuration layout into the fixed wing configuration layout, and providing thrust by the tail-thrust propeller 2. The pitching, rolling and yawing motion of the aircraft can be achieved by changing the biasing of the trailing edge flap 5.

Figure 24:
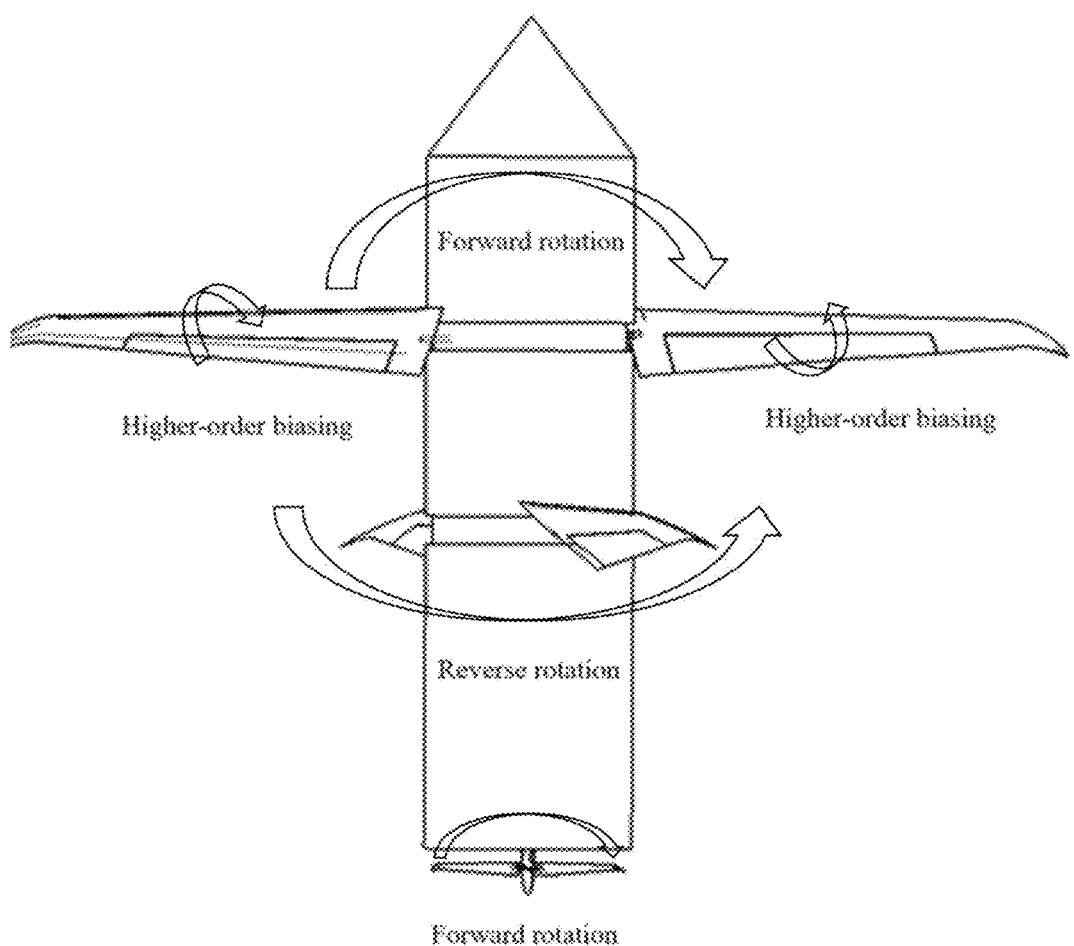
FIG. 24 is a schematic diagram of coupling control of morphing wings, a tail-thrust propeller, and trailing edge flaps of a rotary wing-fixed wing convertible morphing aircraft according to the present disclosure.

Specifically, as shown in FIG. 24, in the rotary wing configuration layout, the rotating speed of the morphing wing 3 and the rotating speed of the tail-thrust propeller 2 are changed, and the trailing edge flap 5 is biased to achieve different attitude motion in flight mode. The coupling control of a rotating speed difference momentum between the morphing wing 3 and the tail-thrust propeller 2 and a biasing momentum of the trailing edge flap 5 can achieve the maneuvering flight of the aircraft in air and water.

Figure 25:
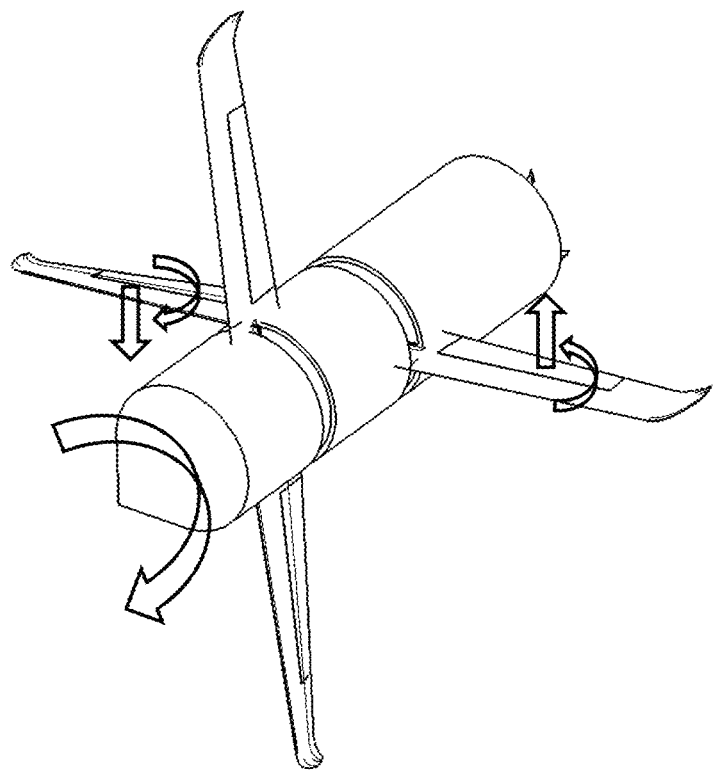
FIG. 25 is a schematic diagram of leftward rolling of a rotary wing-fixed wing convertible morphing aircraft according to the present disclosure.
Figure 26:
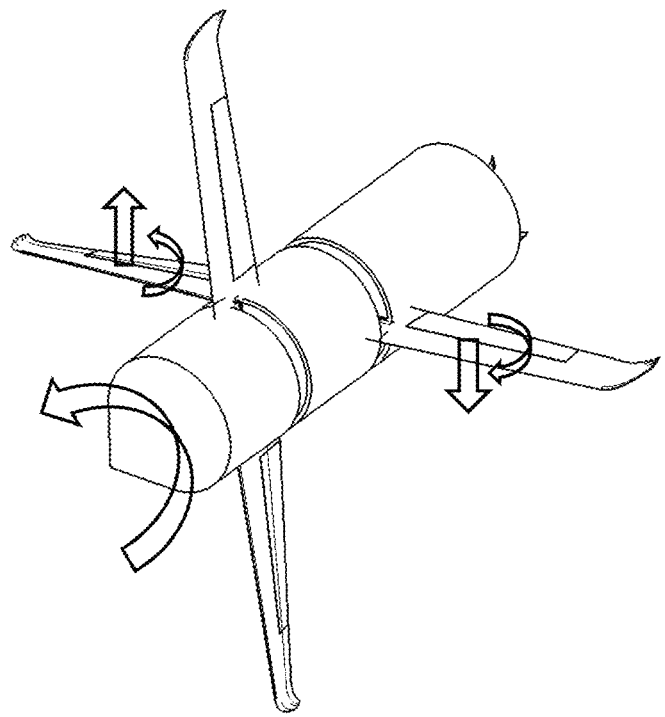
FIG. 26 is a schematic diagram of rightward rolling a rotary wing-fixed wing convertible morphing aircraft according to the present disclosure.
Figure 27:
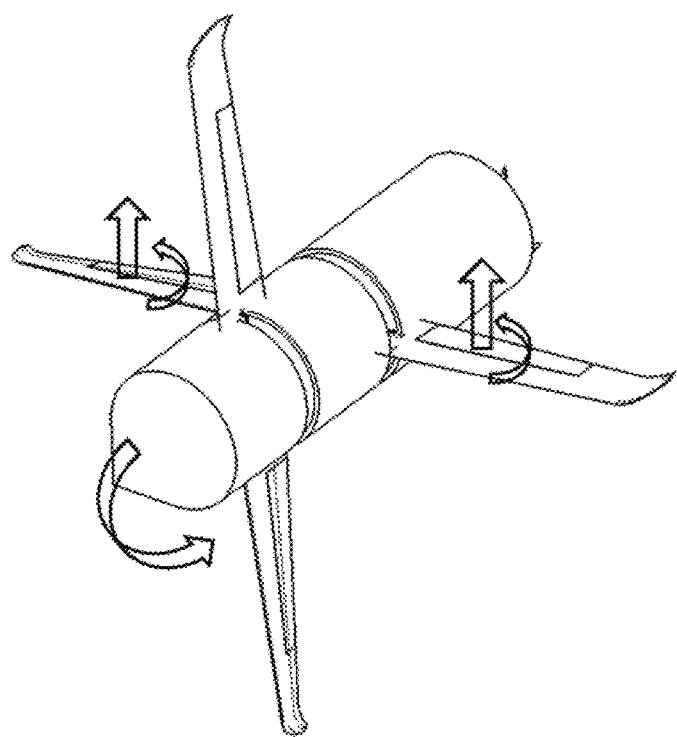
FIG. 27 is a schematic diagram of pitch-up motion of a rotary wing-fixed wing convertible morphing aircraft according to the present disclosure.
Figure 28:
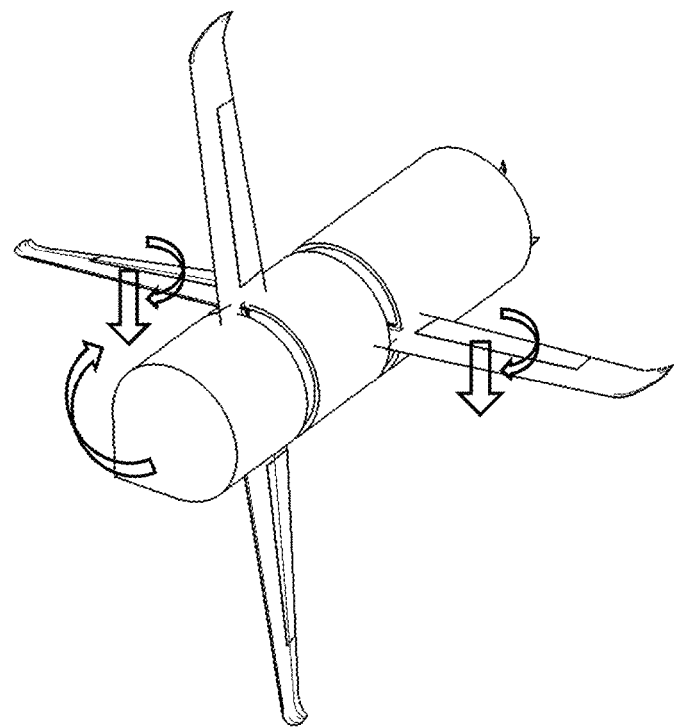
FIG. 28 is a schematic diagram of pitch-down motion of a rotary wing-fixed wing convertible morphing aircraft according to the present disclosure.
Figure 29:
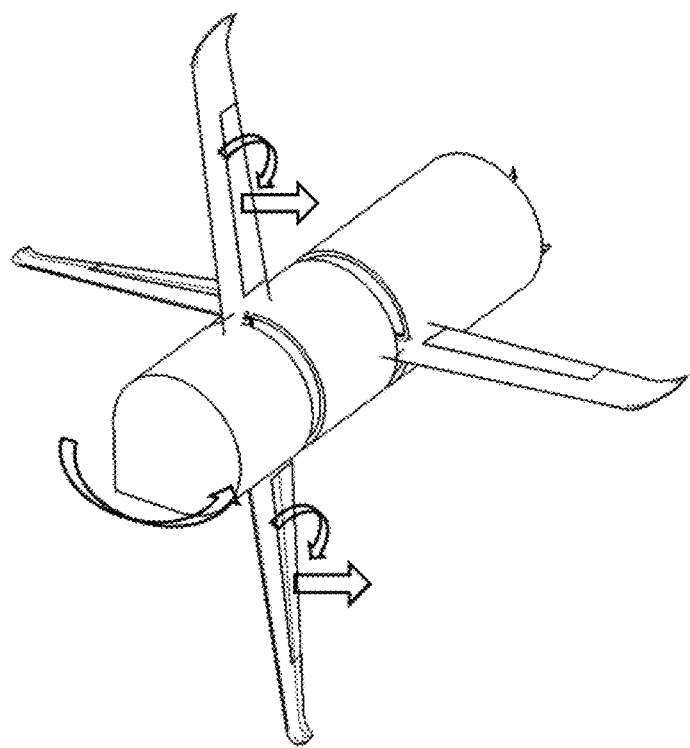
FIG. 29 is a schematic diagram of leftward yaw of a rotary wing-fixed wing convertible morphing aircraft according to the present disclosure.
Figure 30:
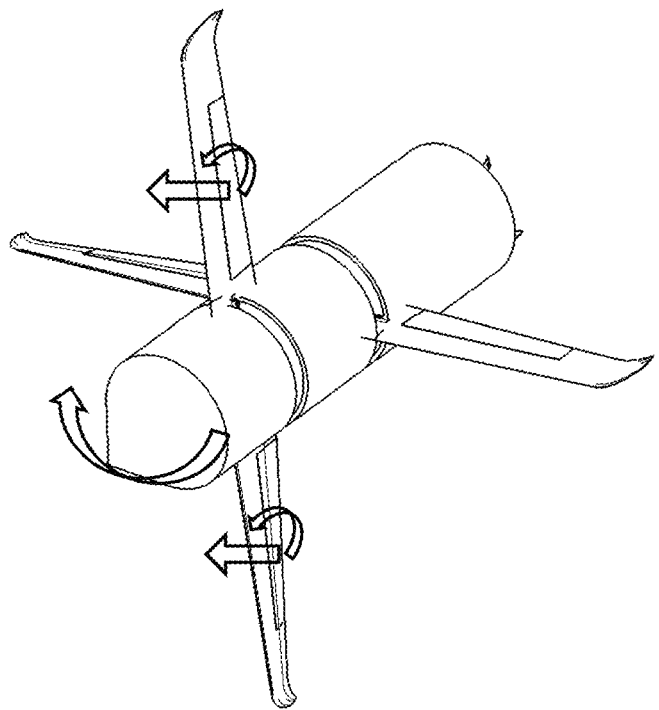
FIG. 30 is a schematic diagram of rightward yaw of a rotary wing-fixed wing convertible morphing aircraft according to the present disclosure.

In the fixed wing configuration layout, an attitude of the aircraft is controlled through the trailing edge flap 5. As shown in FIG. 25, the trailing edge flap 5 of the morphing wing 3 on the left of the aircraft (that is, the trailing edge flap 5 of the morphing wing 3 on the right in FIG. 25) is controlled to bias upwards, and the trailing edge flap 5 of the morphing wing 3 on the right of the aircraft (that is, the trailing edge flap 5 of the morphing wing 3 on the left in FIG. 25) is controlled to bias downwards, thus achieving leftward rolling motion of the aircraft. As shown in FIG. 26, the trailing edge flap 5 of the morphing wing 3 on the left of the aircraft (that is, the trailing edge flap 5 of the morphing wing 3 on the right in FIG. 26) is controlled to bias downwards, the trailing edge flap 5 of the morphing wing 3 on the right of the aircraft (that is, the trailing edge flap 5 of the morphing wing 3 on the left in FIG. 26) is controlled to bias upwards, thus achieving right rolling motion of the aircraft. As shown in FIG. 27, the trailing edge flaps 5 of the morphing wings 3 (that is, the trailing edge flaps 5 of the morphing wings 3 on the left and right in FIG. 27) are controlled to rotate upwards, thus achieving pitch-up motion of the aircraft. As shown in FIG. 28, the trailing edge flaps 5 of the morphing wings 3 (that is, the trailing edge flaps 5 of the morphing wings 3 on the left and right in FIG. 28) are controlled to rotate downwards, thus achieving pitch-down motion of the aircraft. As shown in FIG. 29, the trailing edge flaps 5 of the morphing wings 3 (that is, the trailing edge flaps 5 of the morphing wings 3 on the up and down sides in FIG. 29) are controlled to rotate leftwards (right in FIG. 29), thus achieving leftward yaw of the aircraft. As shown in FIG. 30, the trailing edge flaps 5 of the morphing wings 3 (that is, the trailing edge flaps 5 of the morphing wings 3 on the up and down sides in FIG. 30) are controlled to rotate rightwards (left in FIG. 30), thus achieving rightward yaw of the aircraft.

The morphing wing 3 in this embodiment has two degrees of freedom, that is, each morphing wing structure is rotatable around the central line of the fuselage 1, and each morphing wing 3 is rotatable around the tilting mounting shaft 7 of the morphing wing 3, and the mutual coupling of the morphing motion with different degrees of freedom is achieved through the rotation and higher-order biasing of the trailing edge flap 5.

In this embodiment, the conversion between the rotary wing configuration layout and the fixed wing configuration layout can be achieved through the morphing of the morphing wing 3, which is simple, and the combination of the two layouts and the two flight modes can achieve multi-mode air-water transition, thus combining the advantages of the rotary wing configuration layout and the fixed wing configuration layout. The optimal aerodynamic performance of the rotary wing-fixed wing convertible morphing aircraft 100 in different flight modes can be achieved due to the single/coupling motion of the morphing wing 3. The aircraft in different layouts has different aerodynamic characteristics, maneuvering characteristics and dynamic characteristic, thus having the advantages of both water and air aircraft, which overcomes the speed restriction of the rotary wing aircraft and the maneuverability limitation of the fixed wing aircraft. The aircraft has the advantages of hovering and maneuvering control with different attitudes of the rotary wing aircraft, and high-speed forward flight and strong unsteady-nonlinear aerodynamic effect of the fixed wing aircraft.

In an underwater mode and an air mode, rapid transition and different attitude flight can be carried out through the coupling motion of the morphing wing 3 and the tail-propelled propeller 2, thus achieving composite coupling and transition conversion through morphing motion of the aircraft in different media, different flight modes and different flight layouts, such that the rotary wing-fixed wing convertible morphing aircraft 100 in this embodiment has multiple characteristics such as high confidence, sensitivity, high maneuverability, robustness, and excellent aerodynamics.

According to the rotary wing-fixed wing convertible morphing aircraft 100 in this embodiment, the hovering flight/forward flight in an air and water media can be achieved through the coupling control of the morphing wing 3, the trailing edge flap 5 and the tail-thrust propeller 2, which reduces the control difficulty, improves the stability and robustness of the aircraft, and has high confidence control capability.

The rotary wing-fixed wing convertible morphing aircraft 100 in this embodiment has a layout which is symmetrical about the center of gravity and the central line thereof and streamlined, thus reducing induced drag and aerodynamic interference, obtaining high confidence, robustness, and maneuverability. Dual use of the aircraft is achieved through the morphing wing 3, thus optimizing the performance in different media. The aircraft has a simple morphing mode, simple structure, high practicability and low cost, and achieves underwater-surface-air trinity attack.

In the rotary wing-fixed wing convertible morphing aircraft 100 in the fixed wing mode in this embodiment, the morphing wing 3 can be used as both a lift wing surface and an all-moving tailplane to increase the lift force, and the morphing wing 3 can be used as both a vertical wing, or a fin control surface to increase the stability and reduce the control difficulty of the aircraft.

The layout of the rotary wing-fixed wing convertible morphing aircraft 100 in this embodiment combines the rotary wing configuration layout and the fixed wing configuration layout, thus achieving multi-mode medium transition, and reducing the influence of multiphase flow interference, surface effect and the like during the water-air crossing.

The rotary wing-fixed wing convertible morphing aircraft 100 in this embodiment has two flight modes (that is, hovering flight and forward flight) and two aerodynamic layouts (that is, the rotary wing configuration layout and fixed wing configuration layout) combined with each other at the same time during flight. The rotary wing-fixed-wing convertible morphing aircraft 100 in this embodiment can achieve both hovering flight and forward flight in water and air. The rotary wing configuration layout is adopted during hovering flight of the aircraft to achieve large maneuvering flight. The fixed-wing configuration layout and the tail-thrust propeller 2 are adopted during forward flight of the aircraft to improve the maximum forward flight speed, reduce the control difficulty, thus achieving high-speed ballistic forward flight to achieve the optimal aerodynamic performance.

In a case that the rotary wing-fixed-wing convertible morphing aircraft 100 in this embodiment is in the fixed wing configuration layout, the fuselage 1 can rotate around the central shaft 6 of the fuselage 1, while the morphing wing 3 keeps its azimuth constant, thus forming a typical gyro body. The rotation of the fuselage 1 keep it stable, resist external interference, thus maintaining a flight path. The gyro force generated by rotation of the fuselage 1 is helpful to increase the penetration and lethality of the aircraft, maintain stronger stability and angular momentum, provide attack accuracy, thus having broad military development potential.

The two aerodynamic layouts of the rotary wing-fixed wing convertible morphing aircraft 100 in this embodiment have different aerodynamic characteristics, maneuvering characteristics and altitude characteristics, thus having the advantages of both the fixed wing aircraft and the rotary wing aircraft. The fixed wing configuration layout can achieve double tailplane layout and cross layout, thus overcoming the maximum flight speed restriction of the rotary wing aircraft and various maneuvering restrictions of the fixed wing aircraft.

According to the rotary wing-fixed wing convertible morphing aircraft 100 in this embodiment, the morphing wing 3, the trailing edge flap 5 and the tail-thrust propeller 2 are mutual coupled and controlled, so that the control difficulty is reduced, the control redundancy is lowered, the control difficulty is reduced, the stability is increased, the maximum flight speed, stability, and robustness of the aircraft are improved, and high confidence control capability is achieved.

The rotary wing-fixed wing convertible morphing aircraft 100 in this embodiment has multi-degree-of-freedom control mode, including two morphing of the trailing edge flap 5 and the morphing wing 3. Such control mode greatly increases the flexibility and the controllability of the aircraft, making the aircraft achieve quick conversion of the diversified motion in different flight modes. Different modes, different controls and different thrust vectors are coupled and interact with each other to achieve the high-confidence maneuverability and sensitivity of the aircraft. Meanwhile, the composite morphing wing structure has composite aerodynamic effect and composite controlling effect, which optimizes the aerodynamic characteristics and robustness of the aircraft.

The rotary wing-fixed wing convertible morphing aircraft 100 in this embodiment combines the rotary wing configuration layout with the fixed wing configuration layout to achieve multiple crossing area modes.

The rotary wing-fixed wing convertible morphing aircraft 100 in this embodiment can be used in multi-scenario applications such as underwater, surface and air, and is not limited to single scene application. Therefore, according to the flight mission, the application mode and cost effect, different structures should be adopted to achieve relevant multi-use aircraft design in the overall layout and core morphing mode.

The rotary wing-fixed wing convertible morphing aircraft 100 in this embodiment can be applied to wider fields, mainly including the following:

Military application: the rotary wing-fixed wing convertible morphing aircraft 100 in this embodiment can be used for missions such as rapid deployment, reconnaissance, search and rescue of special forces to achieve multi-scenario application in air and water.

Civil aviation: the rotary wing-fixed wing convertible morphing aircraft 100 in this embodiment can provide rapid and efficient traffic connection between cities or areas with complex terrain and limited infrastructure.

Medical first aid: the rotary wing-fixed wing convertible morphing aircraft 100 in this embodiment can quickly transfer a patient from an incident place to a hospital or other treatment facilities, which is especially suitable for dealing with traffic jams and poor road access.

Search and rescue: the rotary wing-fixed wing convertible morphing aircraft 100 in this embodiment can provide rapid response in emergency situations such as natural disasters and accident scenes, transport people and materials to disaster-stricken areas, and evacuate people when necessary.

Fire suppression: in the scenarios of forest fires or urban fires, the rotary wing-fixed wing convertible morphing aircraft 100 in this embodiment can rapidly transport firefighting equipment and personnel to achieve efficient firefighting and rescue.

Scientific research and exploration: the rotary wing-fixed wing convertible morphing aircraft 100 in this embodiment can carry out scientific research, geological exploration and other missions in harsh environments such as polar regions and mountainous areas to provide efficient air support.

News reporting and film shooting: the rotary wing-fixed wing convertible morphing aircraft 100 in this embodiment can provide a stable and high-definition aerial shooting effect, making news reporting and film shooting more visually impactful.

VIP and business transportation: the rotary wing-fixed wing convertible morphing aircraft 100 in this embodiment can provide fast, comfortable and private travel modes for high-end customers and achieve point-to-point air connection service.

Logistics transportation of UAV (unmanned aerial vehicle): with the development of UAV technology, the rotary wing-fixed wing convertible morphing aircraft 100 in this embodiment can be used for logistics transportation, which improves the transportation speed and reduces the transportation cost. The rotary wing-fixed wing convertible morphing aircraft 100 is especially suitable for special terrains, or areas far away from the conventional traffic networks.

Environmental monitoring and disaster assessment: the rotary wing-fixed wing convertible morphing aircraft 100 in this embodiment can monitor the ground environment in real time in the air, and help the government and relevant departments find and warn potential natural disasters in time, thus providing data support for disaster prevention and mitigation.

Tour and sightseeing: the rotary wing-fixed wing convertible morphing aircraft 100 in this embodiment can be used as a sightseeing tool which allows tourists to overlook scenic spots in the air, especially some special areas such as mountains and islands, thus bringing more shocking travel experiences to the tourists.

Urban air traffic: with the accelerated development of urbanization, the air traffic will become an important direction of urban traffic in the future. The rotary wing-fixed wing convertible morphing aircraft 100 in this embodiment is expected to become an option for urban air travel, thus reducing the ground traffic pressure and improving the travel efficiency.

Security patrol: the rotary wing-fixed wing convertible morphing aircraft 100 in this embodiment can be used for security guard missions such as border patrol, maritime cruise, etc., to improve alert efficiency and ensure national security.

Specific examples are used herein for illustration of the principles and embodiments of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A rotary wing-fixed wing convertible morphing aircraft, comprising:
    a fuselage, wherein a tail of the fuselage is provided with a tail-thrust propeller; and
    at least two morphing wing structures arranged on the fuselage, wherein each of the at least two morphing wing structures comprises at least two morphing wings, and is rotatable around a central line of the fuselage; each of the at least two morphing wings has an adjustable tilting angle, and comprises a morphing wing body and at least one trailing edge flap which is located at a tail of the morphing wing body and is rotatable relative to the morphing wing body; and the rotary wing-fixed wing convertible morphing aircraft is in a fixed wing configuration layout, or a rotary wing configuration layout.

2. The rotary wing-fixed wing convertible morphing aircraft according to claim 1, wherein the at least two morphing wings of each of the at least two morphing wing structures are uniformly distributed around the central line of the fuselage.

3. The rotary wing-fixed wing convertible morphing aircraft according to claim 1, wherein each of the at least two morphing wing structures is connected to a central shaft of the fuselage through a morphing rotating device, and the morphing rotating device is able to drive the at least two morphing wing structures to rotate around the central line of the fuselage.

4. The rotary wing-fixed wing convertible morphing aircraft according to claim 1, wherein the tilting angle of each of the at least two morphing wings is rotated around a tilting mounting shaft thereof through a tilting rotating device, thus achieving adjustment of the tilting angle of each of the at least two morphing wings.

5. The rotary wing-fixed wing convertible morphing aircraft according to claim 1, wherein each of the at least one trailing edge flap is rotated relative to the morphing wing body through a trailing edge flap rotating device.

6. The rotary wing-fixed wing convertible morphing aircraft according to claim 1, wherein in a case that the rotary wing-fixed wing convertible morphing aircraft is in a fixed wing configuration layout, an included angle between adjacent morphing wing structures is 0° or $$\frac{180°}{n},$$

wherein n is a number of the at least two morphing wings in each of the at least two morphing wing structures.

7. The rotary wing-fixed wing convertible morphing aircraft according to claim 6, wherein each of the least two morphing wing structures comprises two morphing wings, and in a case that the rotary wing-fixed wing convertible morphing aircraft is in the fixed wing configuration layout, the included angle between the two adjacent morphing wing structures is 0° or 90°.

8. The rotary wing-fixed wing convertible morphing aircraft according to claim 1, wherein in a case that the rotary wing-fixed wing convertible morphing aircraft is in the rotary wing configuration layout,
when the tail-thrust propeller rotates forward, a sum of a torque generated by some of the at least two morphing wing structures in forward rotation and a torque generated by the tail-thrust propeller in forward rotation is a total forward rotation torque, and a sum of the total forward rotation torque and a torque generated by a remaining of the at least two morphing wing structures in reverse rotation is zero; and
when the tail-thrust propeller rotates reversely, a sum of a torque generated by some of the at least two morphing wing structures in reverse rotation and a torque generated by the tail-thrust propeller in reverse rotation is a total reverse rotation torque, and a sum of the total reverse rotation torque and the torque generated by a remaining of the at least two morphing wing structures in forward rotation is zero.

9. The rotary wing-fixed wing convertible morphing aircraft according to claim 1, wherein the tilting angle of each of the at least two morphing wings ranges from −10° to 100°.

10. The rotary wing-fixed wing convertible morphing aircraft according to claim 1, wherein in a case that the rotary wing-fixed wing convertible aircraft is in hovering flight, the rotary wing-fixed wing convertible morphing aircraft is in the rotary wing configuration layout, and maneuvering flight of the rotary wing-fixed wing convertible morphing aircraft is achieved by biasing of the at least one trailing edge flap of each of the at least two morphing wings;
the rotary wing-fixed wing convertible morphing aircraft converts from the rotary wing configuration layout to the fixed wing configuration layout during transition from the hovering flight to forward flight thereof; and
in a case that the rotary wing-fixed wing convertible morphing aircraft flies forward, the rotary wing-fixed wing convertible morphing aircraft is in the fixed wing configuration layout, forward power is provided through rotation of the tail-thrust propeller, and attitude motion and overall trim are controlled by the at least one trailing edge flap of each of the at least two morphing wings.

* * * * *